United States Patent [19]

Seymour

[11] 4,136,568

[45] Jan. 30, 1979

[54] ELECTRO-OPTIC SPACE POSITIONER

[75] Inventor: Herbert R. Seymour, Glen Cove, N.Y.

[73] Assignee: Grumman Aerospace Corporation, Bethpage, N.Y.

[21] Appl. No.: 815,996

[22] Filed: Jul. 15, 1977

[51] Int. Cl.$^2$ .................. G01M 9/00; G01H 9/00
[52] U.S. Cl. ................................. 73/655; 356/141
[58] Field of Search ............ 73/653, 655, 71.1, 71.3; 356/1, 4, 141, 152

[56] References Cited

U.S. PATENT DOCUMENTS

| 2,700,318 | 1/1955 | Snyder | 356/141 |
| 3,486,826 | 12/1969 | Colvin et al. | 356/141 |
| 3,706,493 | 12/1972 | Redmann | 356/4 |
| 3,858,201 | 12/1974 | Foster | 356/141 X |
| 3,951,550 | 4/1976 | Slick | 356/141 |

FOREIGN PATENT DOCUMENTS 1446960  6/1966  France ........................... 73/71.3

Primary Examiner—James J. Gill
Attorney, Agent, or Firm—Arthur S. Haapaniemi; Richard G. Geib

[57] ABSTRACT

An electro-optic sensor including a cylindrical lens and a photosensitive diode array at the focal plane of the lens for measuring the angular displacement of a point light source from the neutral plane of the lens.

In one application of the inventions the vibrational characteristics of an aircraft wing structure under load can be determined. A plurality of light emitters are judiciously scattered over the surface of the wing and the electro-optic sensor is attached to the fuselage. The emitters are sequentially energized and the readings of the sensor are synchronized with the emitters to provide the desired data. In other applications a pair of sensors will give two dimensional information and two pairs can be used to give three dimensional information.

2 Claims, 10 Drawing Figures

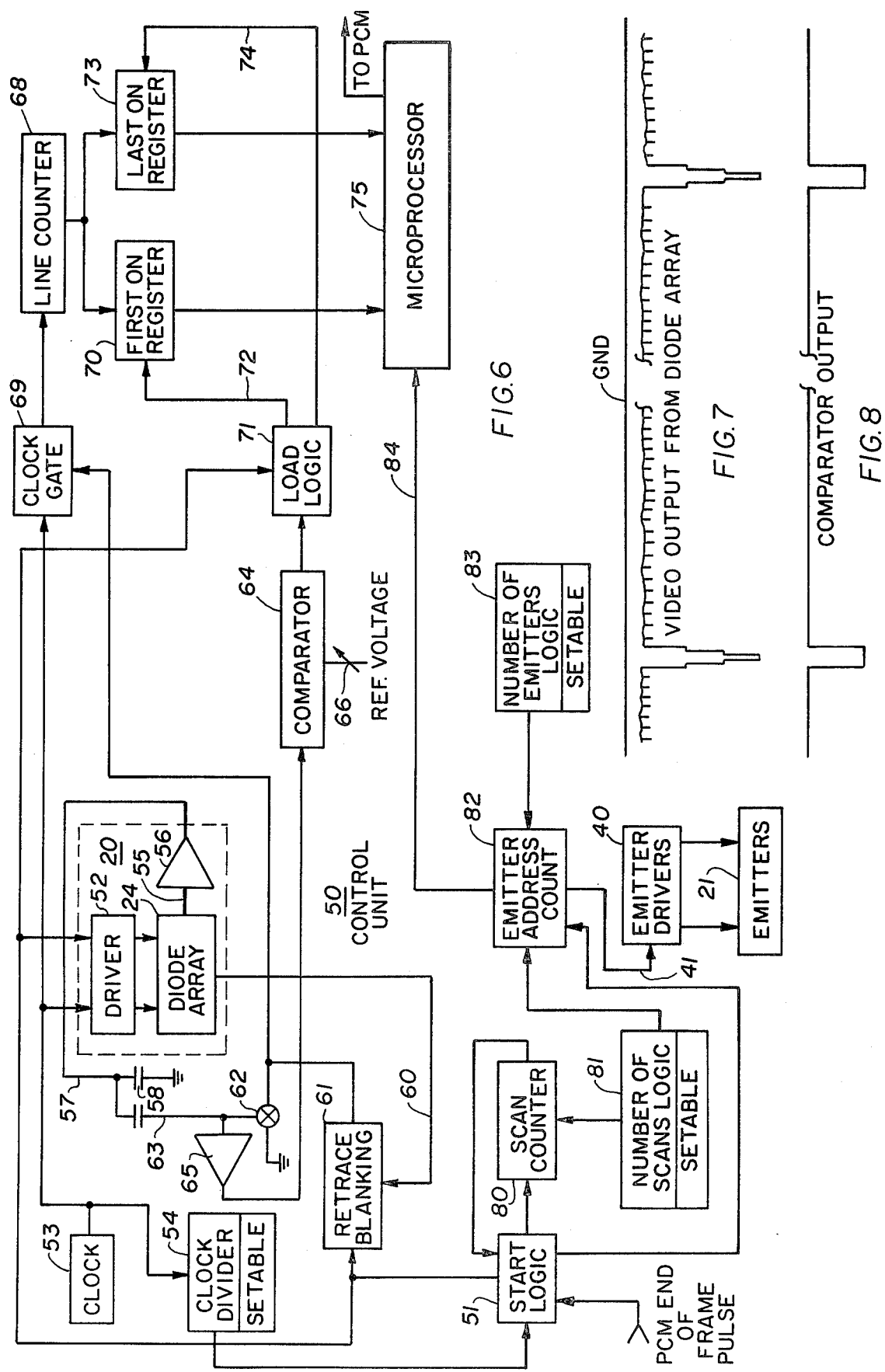

ELECTRO-OPTIC SPACE POSITIONER

BACKGROUND OF THE INVENTION

The present invention relates to space position indicators and has particular reference to optical devices therefor.

There is an urgent need in many fields for apparatus which will provide accurate measurement of the position of a point in space with respect to a reference. Such a system should possess high resolution capability in determining point coordinates, high frequency response to determine transient phenomena and the ability to generate signal data outputs in real time.

Intended applications are many and varied, all with the need for a precise measurement of spatial point position. Examples are flutter and buffet analysis of aircraft, structural load determination, flight test instrumentation, recovery and docking aids, landing aids, surveying, collision avoidance systems, flexure evaluation of bridges, navigation instruments and so on.

Consider now the example of the measurement of aircraft wing deflections while in flight and the presently available methods therefor. The use of strain gages is limited by wing materials and structural designs, which despite large wing deflections may yield low, non-repeatable strain levels. Accelerometers are not suitable for steady state or low frequency wing deflections. Cinematographic techniques are inadequate from a resolution and accuracy standpoint and are often employed as a qualitative tool only.

The present invention is designed to fill this technical void. The system employing the electro-optic sensor yields real time quantitative data with an accuracy equal to or better than that obtained by either strain gage or accelerometer systems while retaining the reliability and design versatility inherent with cinematographic/videographic target tracking systems.

SUMMARY OF INVENTION

The electro-optic sensor or head of this invention includes a cylindrical lens which stigmatizes the light rays from a remote light source to a line at the focal plane of the lens instead of focussing the light rays to a point as would occur with a circular lens. The line image is stigmatized at a photoelectric pick-off device whose output corresponds to the position of the line image. A typical pick-off device is a light sensitive diode array which is scanned electronically to locate the position of the line image. The position of the line image is indicative of the direction to the light source measured from the neutral plane of the lens. Because of the cylindrical lens, the electro-optic sensor is insensitive to lateral position displacement and is sensitive only to displacement normal to the neutral plane.

In applying the electro-optic head to the problem outlined above, a plurality of light emitting diodes are strategically located over the entire undersurface of the aircraft wing. The diodes are sequentially energized by a control circuit and the light flux from each emitter is received at an electro-optic sensor attached to the fuselage of the aircraft. The photoelectric pick-off of the sensor transmits positional information to a control unit which manipulates the information to yield exact data on the movement of each light source.

Each emitter is energized for about five milliseconds. During the "on" time the electro-optic head interrogates the emitter image for a number of scans, settable within the control unit, generally about eight scans. The control unit deciphers each scan, averages the results of all scans, outputs the results of all scans, outputs the resulting positional data with the emitter identification (1D) and then proceeds to the next emitter and repeats the process.

The frequency response data scan rate of the system employed will dictate the rate of acceptable applications to measurement of vibrating structures.

For example, for quasi-steady state data acquisition, scan averaging can be effectively used to minimize the effect of high frequency oscillations.

As will be described in the matter to follow, the measurement may be made in one, two or three dimensions with one or a plurality of cylindrical lenses.

This positional information can be used to determine first or second derivitives with respect to time for tracking purposes or vibration studies, if desired. One dimensional applications are exemplified by deflection measurements for load studies; two-dimensional applications might be in alignment or range measurement; three-dimensional uses would involve relatively moving vehicles in space, as in space rendezvous, refueling operations and so on.

BRIEF DESCRIPTION OF DRAWINGS

For a more complete understanding of the invention reference may be had to the accompanying diagram, in which:

FIG. 6 illustrates a circuit diagram.

FIG. 7 illustrates a typical pulse train output.

FIG. 8 illustrates a typical comparator output.

DESCRIPTION OF PREFERRED EMBODIMENTS

Figure 1:
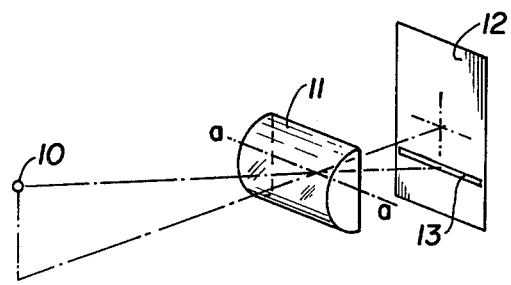
FIG. 1 is a pictorial illustration of a cylindrical lens.
Figure 2:
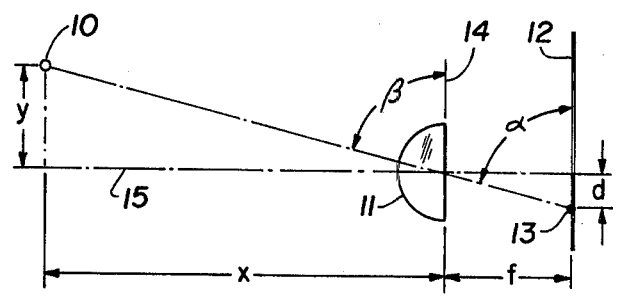
FIG. 2 defines geometric relationships involved in FIG. 1.

With reference now to the drawings, a light source 10 is stigmatized by a cylindrical lens 11 at the focal plane 12 of the lens 11 as a line 13. The line 13 is parallel to the longitudinal axis of lens 11. As seen in FIG. 2 When the light source 10 is located in a plane parallel to the diametral plane 14 of lens 11 at a distance x therefrom, and displaced from the neutral plane 15 of lens 11 by an amount y the image 13 falls on the focal plane 12, which is a distance f behind plane 14, at a distance d below the neutral plane 15. The angle $\alpha$ = arc tan d defines the angle $\beta$ = arc tan x/y = F($\alpha$), a function of $\alpha$, where f and F($\alpha$) has been determined from laboratory lens calibration. When F($\alpha$) is equal to $\alpha$ then $\beta = \alpha$ and y/x = d/f. That relationship is substantially true and will be assumed to exist for ease of description.

Figure 3:
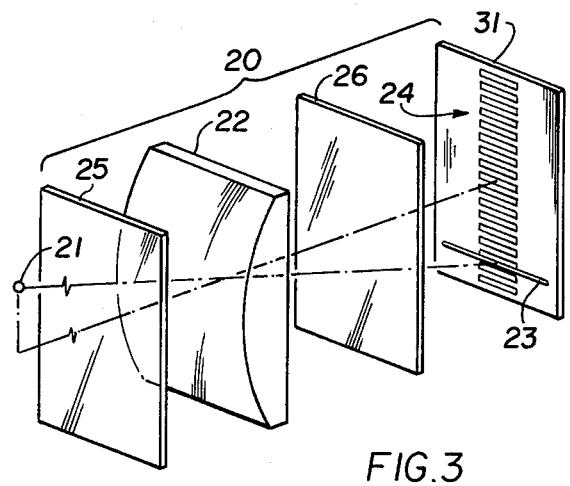
FIG. 3 illustrates an arrangement of optical and electrical components.

FIG. 3 shows the optical components and position sensor of an electro-optic head 20 using the principle of FIG. 2. The electro-optic head is used in conjunction with a light source 21. Preferably the light source 21 is a light emitting diode operating in the infrared range, so as to permit filtering out of unwanted light energy from other sources. The cylindrical lens 22 stigmatizes the I.R. energy from emitter 21 into a line of light 23 on the light sensitive diode array 24. When the emitter 21 moves vertically, the line 23 moves proportionally in the opposite direction, up or down the array 24. Lateral displacement, parallel to the lens, does not affect the vertical position of the line 23.

An infrared pass filter 25 placed in front of lens 22 has a low end cutoff of about 0.78 micrometers thus eliminating visible light from the head 20. A second filter 26 in front of the diode array 24 has a center wavelength equal to the ambient wavelength of the emitter 21. This filter 26 rejects all wavelengths except those of the emitter 21 in the near I.R. region i.e. those to which the diode array 24 is most sensitive.

Figure 4:
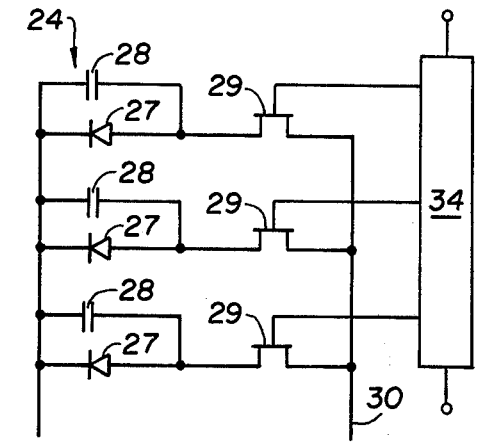
FIG. 4 is a schematic view of a portion of FIG. 3.

FIG. 4 shows a portion of the diode array 24 circuitry which includes a plurality of light sensitive diodes 27 about 0.5 mil wide placed 2 mils apart over a total length of one inch. Each diode cell consists of a diode 27 and a parallel storage capacitor 28 and is connected through a solid state switch 29 to a common video buss 30. The charge from each capacitor 28 is dumped sequentially onto the video buss 30 through switches 29 under the control of a scanner 34 and is conveyed to a sample and hold circuit in a control unit as will be explained later. The electronics to derive the video charge and actuate switches 29 are contained within the diode array 24 and on the mounting printed circuit board 31. Suitable commercially available arrays are made by RETICON Corporation, and are identified as the "C" series solid state line scanners. In particular, the RL512C or RL 512EC units are preferred as having an appropriate number of diodes (512) and separation (1–2 mils) between diodes to give the desired sensitivity and range to the detector.

Figure 5:
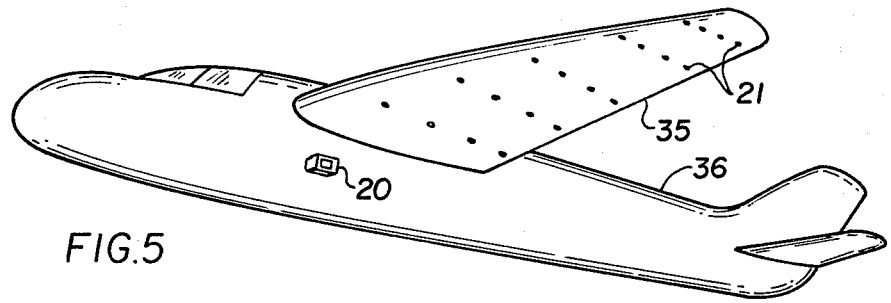
FIG. 5 illustrates use in aircraft testing.

In a particular application of the space position detector, FIG. 5, a plurality of light emitting diodes 21 are deployed on the underside of an aircraft wing 35. The aircraft fuselage 36 carries the electro-optic head 20. With this arrangement, the diodes 21 are sequentially energized and their positions in a plane normal to the longitudinal axis of the aircraft, (e.g. vertically in the usual sense) are detected. There may be some 200 emitters, each of which is to be scanned eight times in 5 milliseconds each.

The emitter driver unit 40, FIG. 6, provides the current drive for pulsing each emitter 21. Sequentially timed commands are received on line 41 to activate a Darlington Power transistor arrangement supplying the power to the emitter assembly. The duty cycle of each driver is the reciprocal of the number of emitters to be driven. The rise and fall time of the driver/emitter combination is about 1.5 and 11.5 micro seconds respectively. A power supply and one driver for each emitter is contained within the unit 40. The electronic control unit 50 which is substantially all of FIG. 6 except for the units 20, 21 and 40 provides all the controls, acquisition of data and processing which are required to operate the system.

System initiation is accomplished by an end-of-frame pulse derived from a PCM fed by the output of the control unit 50. This pulse is received at the start logic 51 which issues a start command to the diode array scan logic or driver 52 of the electro-optic head 20. A one megahertz clock 53 is also gated into the driver 52 and the scanning starts. The clock frequency applied to logic 51 determines the diode sample rate and is adjustable in the divider 54 from 300 KHz to 2 MHz.

Diodes in the array 24 are interrogated in sequence by connecting them through their internal MOS switches to the output video line 55. Each switch is closed for one negative half cycle of the clock period, discharging the diode capacitance onto an internal video buss capacitance at line 55. After reaching a steady state (in about 5 nanoseconds) the video line voltage is amplified in amplifier 56 and connected through output line 57 to a hold capacitor 58. The illumination of a diode 37 will discharge the capacitor in parallel therewith e.g. 28 of FIG. 4 creating a definite peak 59 in the video output shown in the waveform in FIG. 7, as that diode is scanned. The position of the peak will identify the illuminated diode.

After the array 24 has been scanned, an end-of-scan pulse is produced at line 60 and is applied to blanking device 61 which produces and applies a video blanking command to a switch 62 to hold the video buss 63 at ground potential. The period of the blanking pulse is adjustable within the circuitry and determines the dwell time before the next scan. A period of 68 microseconds has been selected as appropriate.

The video buss data is applied to a voltage comparator 64 through amplifier 65. The comparator recognizes a pulse which exceeds in amplitude the amplitude of a reference signal 66 also applied to the comparator 64 and produces a step in the output signal at line 67 as shown in FIG. 8 whenever this occurs.

It will be understood that the illuminated line 13 at the diode array 24 may be wide enough to cause more than one diode 27 to be exposed. To overcome this situation, the "first" and "last" diode turned on must be identified. The width of the comparator output 67 represents the quantity of diodes turned on. The number of clock 53 pulses after the blanking pulse from device 61 i.e. from the beginning of a new scan is determined in line converter 68 after transmission through the open gate 69 (The gate 69 is closed during the period of the blanking pulse). The count in counter 68 for the first on diode is registered in register 70 at the leading edge of the comparator 64 output transmitted through the logic circuit 71 onto line 72 and similarly the last-on diode count is registered in register 73 at the trailing edge of the signal at line 67 transmitted through logic 71 onto line 74. At the end of each scan the counts in the first on and last on diode registers 70 and 73 are transferred to a microprocessor 75 where they are averaged to obtain the center diode number.

The completion of the first scan is identified to the start logic 51 and the scan counter 80 is advanced. The number of scans to be performed on one emitter source is determined by settling the number of scans in logic 81. Emitter #N scanning continues until the scan counter 80 reaches the preset number and a pulse from logic 51 advances the emitter address counter 82 to select the next emitter (N + 1) to be energized.

The system then waits for the next end-of-frame pulse to start logic 51 to initiate repetition of the operation. The emitter address counter 82 continues to count and recycles at the number of emitters selected in the number of emitters logic 83. A signal identifying which emitter is illuminated is passed to the microprocessor from the counter 82 through line 84.

In the apparatus just described the motion of each emitter 21 is tracked along a line normal to the wing 35. The spanwise location of each emitter 21 on the wing structure 35 is known so that the one dimension tracking is adequate.

Figure 9:
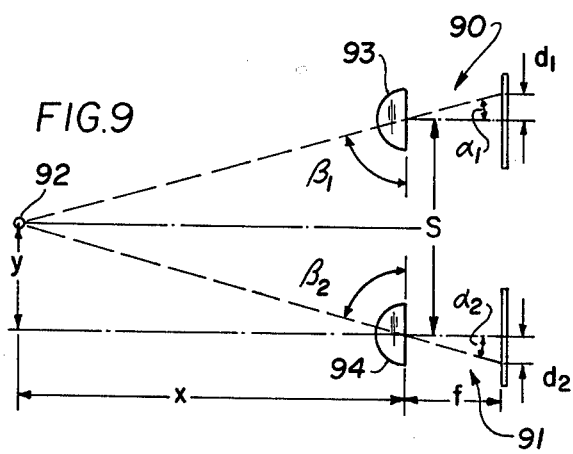
FIG. 9 illustrates geometric relationships involved in a system using a pair of cylindrical lenses.

A pair of electro-optic heads 90, 91 shown in FIG. 9 can be used in a two dimensional problem to find the x and y components of the range or distance to a light source 92. Here electro-optic head 90 detects the projected image from light source 92 at a distance $d_1$ from the neutral plane of lens 93 while electro-optic head 91 detects the projected image from the light source 92 at a distance $d_2$ from the neutral plane of lens 94. Knowing the separation S between the lenses 93 and 94, the distance X to the light source 92 can be determined from the equation $$X = s/ctn\beta_1 - ctn\beta_2 \qquad (1)$$

Where $\beta_1$ and $\beta_2$ are defined as in FIG. 2.

The distance "y" in FIG. 9 may then be obtained from the relationship $$y = x\, ctn\beta_2 \qquad (2)$$

Figure 10:
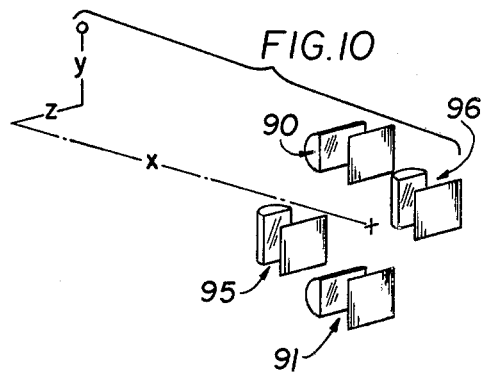
FIG. 10 illustrates how two pairs of cylindrical lenses are deployed.

The distance y may be either in elevation or azimuth depending on the orientation of the lenses 93 and 94, whether in the vertical or horizontal plane respectively. For three dimensional sensing, two pairs of lenses are required, as shown in FIG. 10 where sensors 90, 91 are as described in connection with FIG. 9 and sensors 95, 96 are added to obtain the value of the distance Z.

Having described a preferred embodiment of the electro-optic space positioner and a specific application to which it can be put, I do not wish to be limited to the embodiment or application thereof described herein but declare as my invention all that which comes within the scope of the appended claims.

I claim:

1. Apparatus for determining positional characteristics of a planar surface with respect to a body, a plurality of light sources located on the planar surface, electro optic sensor means including a cylindrical lens and photo electric pickoff means at the focal plane of said lens attached to said body, means for individually and sequentially energizing said light sources, said cylindrical lens stigmatizing the light rays from said light sources at said pickoff means, means for indicating the output of said pickoff device, whereby the output of said pickoff means signifies the positions of said planar surface at the locations of said light sources.

2. In apparatus of the type described for analysis of aircraft wing vibrations under load a plurality of light emitters located on the aircraft wing, an electro-optic sensor on the aircraft fuselage including a cylindrical lens for stigmatizing light rays from said emitters at the focal plane of said lens and a photoelectric pick-off device at said focal plane, said photoelectric pick-off device including a plurality of photodiodes and means for scanning said photodiodes, digital control means including an emitter driver for sequentially energizing said light emitters, clock means for generating clock pulses controlling said photodiode scanning means, counting means for counting said clock pulses, gate means between said clock means and said counting means, said gate means controlled by the output of said pick-off device, whereby the clock pulses counted by said counting means indicates the position of said wing at the location of the particular energized emitter.

* * * * *